United States Patent

Matsuzawa

Patent Number: 5,822,697
Date of Patent: Oct. 13, 1998

[54] HYBRID CELLULAR RADIO COMMUNICATION SYSTEM

[75] Inventor: Naoto Matsuzawa, Saitama, Japan

[73] Assignee: Hitachi America, Ltd., Tarrytown, N.Y.

[21] Appl. No.: 834,560

[22] Filed: Apr. 7, 1997

Related U.S. Application Data

[63] Continuation of Ser. No. 464,602, Jun. 5, 1995, abandoned.

[51] Int. Cl.$^6$ .................................................. H04Q 7/36
[52] U.S. Cl. .......................................... 455/443; 455/444
[58] Field of Search ................................... 455/422, 436, 455/437, 438, 439, 440, 443, 444, 450, 451, 452, 560; 370/329, 330, 331

[56] References Cited

U.S. PATENT DOCUMENTS

| | | | |
|---|---|---|---|
| 4,144,411 | 3/1979 | Frenkiel | 179/2 EB |
| 4,144,496 | 3/1979 | Cunningham et al. | 325/53 |
| 5,067,147 | 11/1991 | Lee | 379/60 |
| 5,193,091 | 3/1993 | Crisler et al. | 370/95.1 |
| 5,239,667 | 8/1993 | Kanai | 455/10 |
| 5,265,263 | 11/1993 | Ramsdale et al. | 455/33.2 |
| 5,278,991 | 1/1994 | Ramsdale et al. | 455/33.2 |
| 5,345,499 | 9/1994 | Benveniste | 379/59 |
| 5,379,446 | 1/1995 | Murase | 455/33.2 |
| 5,392,453 | 2/1995 | Gudmundson et al. | 455/33.2 |
| 5,394,158 | 2/1995 | Chia | 379/59 |
| 5,396,645 | 3/1995 | Huff | 455/33.3 |
| 5,436,956 | 7/1995 | Shiotsuki et al. | 455/33.2 |
| 5,450,473 | 9/1995 | Shiotsuki et al. | 455/33.2 |
| 5,457,810 | 10/1995 | Ivanov et al. | 455/33.2 |
| 5,487,174 | 1/1996 | Persson | 455/33.4 |
| 5,491,834 | 2/1996 | Chia | 455/56.1 |
| 5,499,386 | 3/1996 | Karlsson | 455/33.2 |
| 5,530,910 | 6/1996 | Taketsugu | 455/33.2 |
| 5,548,806 | 8/1996 | Yamaguchi et al. | 455/33.2 |

*Primary Examiner*—Thanh Cong Le
*Attorney, Agent, or Firm*—John J. Sideris, Esq.

[57] ABSTRACT

A hybrid cellular mobile communication system is disclosed that contains a first layer having a plurality of radio communication micro-cells, and a second layer of radio communication cells of a larger size which, in operation, overlay the micro-cells. The hybrid cellular system provides that when a control switching center detects rapid amounts of micro-cell to micro-cell transfers of an ongoing call (such as when a call is occurring from a car moving on a highway), the call is transferred to the second cellular layer for handling. The second cellular layer includes cells which cover a larger geometric area, thereby reducing the number of "hand-offs" or transfers that the call would undergo when the mobile telephone user is traveling quickly across the geographic areas covered by the micro-cells.

6 Claims, 6 Drawing Sheets

HYBRID CELLULAR RADIO COMMUNICATION SYSTEM

This application is a continuation of patent application Ser. No. 08/464,602 filed on Jun. 5, 1995, abandoned.

FIELD OF THE INVENTION

The present invention relates in general to a cellular mobile communications system, and more particularly to a hybrid cellular mobile communications system having a first layer of micro-cells, and an additional layer of larger sized cells which individually cover the geographic area of several micro-cells for handling calls that would require may micro-cell-to-micro-cell transfers.

BACKGROUND OF THE INVENTION

In current cellular radio communications systems, a radio communication link between a mobile telephone and a base station of a cell covering the instant geographic location of the telephone user is established whenever a call is made to or from the mobile telephone. The individual cell, commonly called a "micro-cell," is allocated a specific set of communication channel frequencies. In one type of cellular radio communication system, specifically the time division multiple access (CTDMA) type, neighboring micro-cells are allocated different communication frequencies because of interference that would arise at overlapping boundaries of the micro-cells. The boundaries of micro-cells overlap each other such that the telephone coverage of a geographic area is complete.

When a call is established within a micro-cell, a designated frequency particular to the micro-cell is allocated to the communication link between the mobile telephone and the corresponding base station. If the mobile telephone moves to an area covered by another micro-cell, the call is transferred or "handed-off" to the other micro-cell. During the hand-off, a data protocol exchange occurs between the two micro-cells, and the micro-cell location data and communication link frequency are altered to reflect the new position of the telephone. Every time a micro-cell boundary is crossed, the protocol and data exchange occurs. This exchange is usually seamless and transparent to the caller. However, in a few instances, and for a variety of reasons, the hand-off does not occur seamlessly. In such a case, the caller experiences interruptions and possibly a complete disconnection of the call in progress.

When a mobile telephone caller is traveling at a rapid speed during the call, as when the caller is traveling along a highway or railway, the mobile telephone may cross several micro-cell boundaries. As a result, the call will get handed-off several times from micro-cell to micro-cell. As shown in the example disclosed in FIG. 1, a mobile telephone user traveling from location "A" within the micro-cell of base station "1" (designated "BS1a") to location "B" within the micro-cell of base station "6" (designated "BS6c") would experience three hand-offs.

Typically, the broadcast radius of a micro-cell is less than 1 km. A caller traveling, for example, at 100 km/hr would require approximately 99 hand-offs between micro-cells for a one hour call. Such an occurrence results in a large amount of protocol and data exchange overhead for the cellular system. In addition, the likelihood of call interrupts and disconnection increases greatly.

Accordingly, what is needed is a cellular communication system that can reduce the amount of communication overhead and likelihood of interruptions for calls occurring with rapidly traveling mobile telephone users.

It is, therefore, an object of the present invention to provide a cellular communication system that includes cells covering a larger geographic area so as to reduce the number of cell transfers of a rapidly traveling caller.

It is another object of the present invention to provide a cellular communication system that can reduce the protocol and data exchange overhead resulting from the cell transfers of a rapidly traveling caller.

It is still another object of the present invention to accomplish the abovestated objects by utilizing an system which is simple in design and use, and economical to operate.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

Briefly, the present invention provides for a cellular radio communication system incorporating the current micro-cell arrangement, and including a second cellular layer having cells of a larger broadcast radius and increased signal power for handling the calls of rapidly traveling mobile telephone users. The second cellular layer includes cells whose size provides broadcast coverage over an area that would require several micro-cells to cover, thereby eliminating the number of cells that must be crossed by a traveling mobile telephone user. When the number of hand-offs between micro-cells exceeds a preset threshold in a given time span, a base station transfers the call from a micro-cell of the first layer to a larger cell of the second layer rather than to another micro-cell. Accordingly, a call involving a rapidly traveling mobile telephone user is then handled by the second cellular layer, thereby reducing the amount of hand-offs needed for the duration of the call.

BRIEF DESCRIPTION OF THE DRAWINGS

FIG. 6 is a diagrammatic representation of an exemplary hybrid cellular radio communication system of the present invention as applicable for cellular networks in urban areas which provide coverage over highways, railways or the like.

DETAILED DESCRIPTION OF A PREFERRED EMBODIMENT OF THE INVENTION

Figure 1:
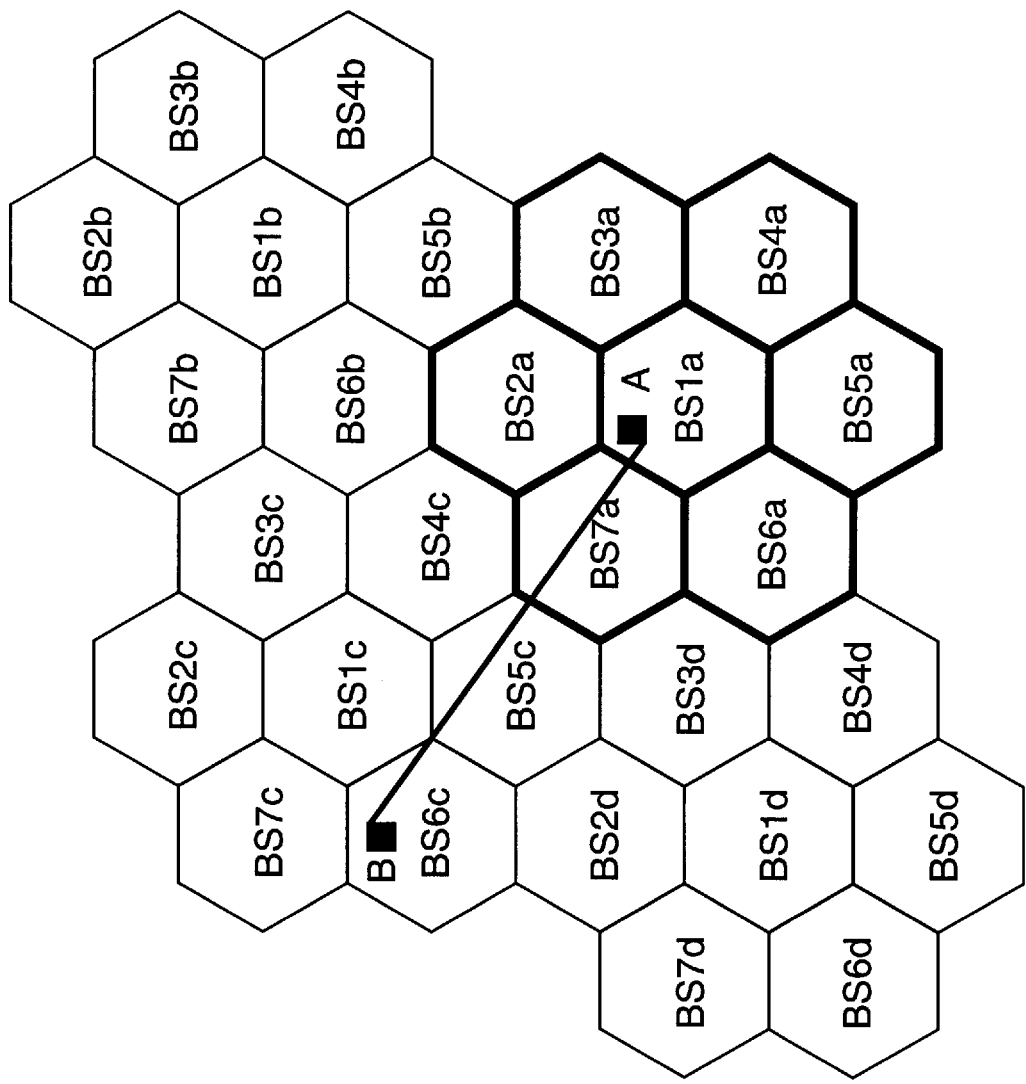
FIG. 1 is a diagram representing the micro-cell arrangement of a prior art cellular radio communication system.
Figure 2:
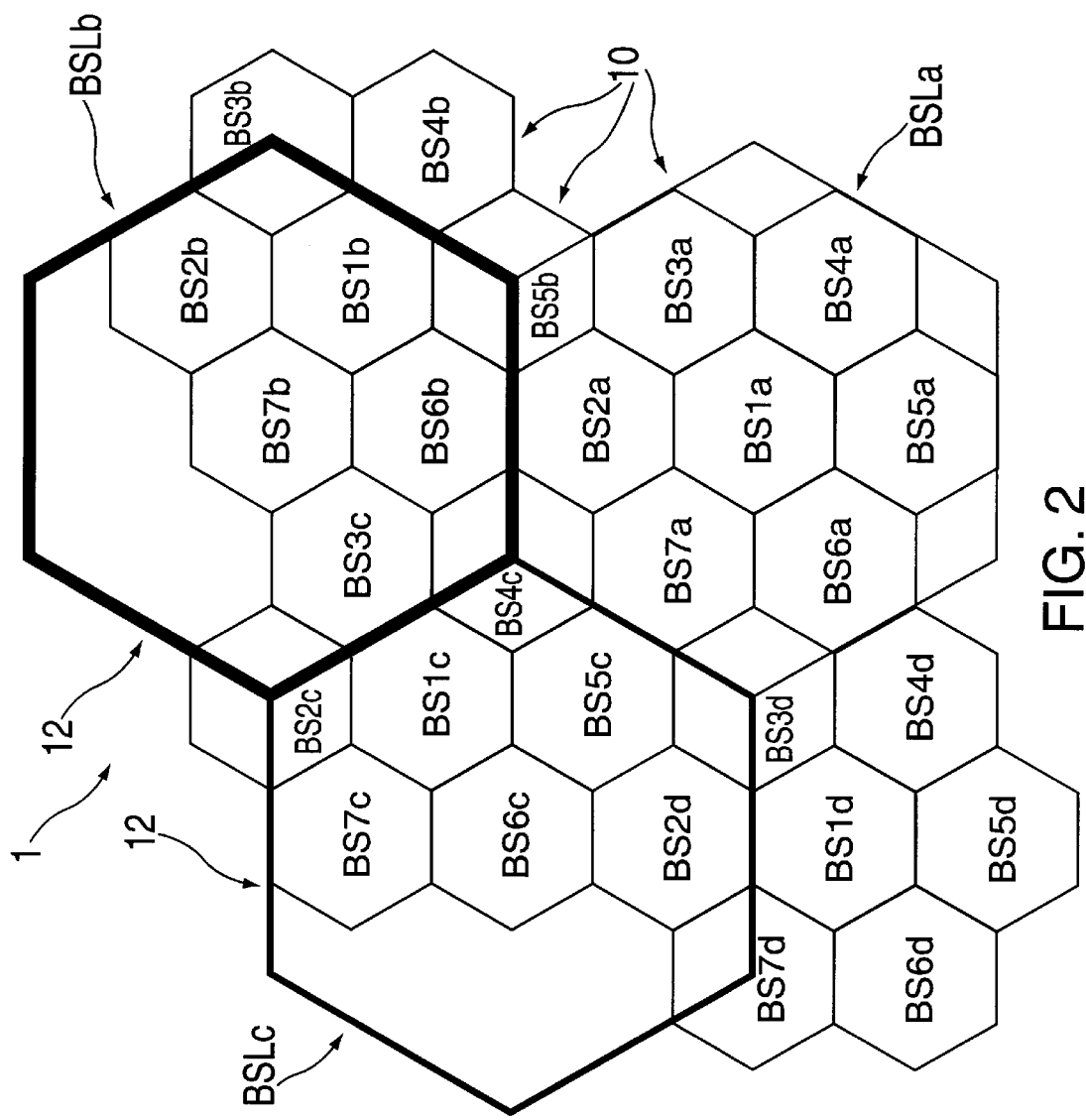
FIG. 2 is a diagram of a hybrid cellular communication system, according to the present invention.

Referring to the drawings, wherein like numerals represent like elements, in FIG. 2, a preferred embodiment of the hybrid cellular radio communication system 1 of the present invention is shown.

FIG. 2 discloses a plurality of micro-cells 10 represented, for illustrative purposes only, by hexagonal symbols having alphanumeric designations having a "BS" prefix. Each micro-cell 10 contains its own base station therein (not shown) for providing radio communications within the representative geographical area. For example, the micro-cell 10 designated "BS4a" has a base station to cover its geographical area, that is distinct from the base station in the micro-cell 10 designated "BS3a." Moreover, each micro-cell 10 is allocated a set of radio communication frequencies that are distinct from the radio frequencies used in each of its neighboring micro-cells 10.

Superimposed over the area covered by a plurality of neighboring micro-cells 10 is a plurality of cells 12, represented, for illustrative purposes only, by the larger hexagonal symbols having alphanumeric designations having a "BSL" prefix. The cells 12, like the micro-cells 10, each contain an individual base station therein (not shown) to provide radio communications coverage for the geographic area represented by the cell 12. The cell 12, having a radius larger than the micro-cell 10, provides coverage for a geographic area greater than that provided by the micro-cell 10. Correspondingly, the strength of the radio signals broadcast within the cell 12 is greater than the signal strength broadcast within the micro-cell 10.

Figure 3:
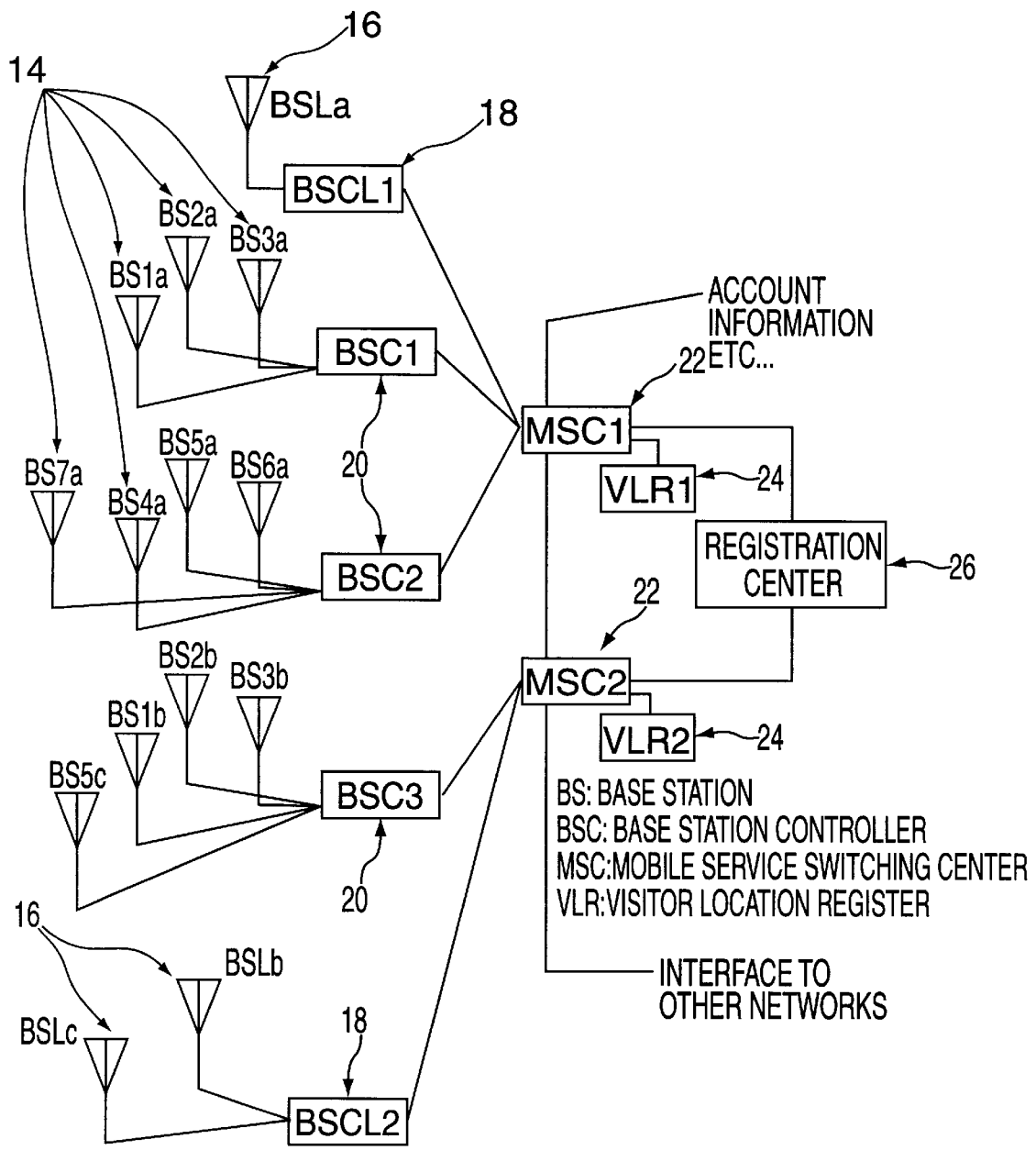
FIG. 3 is a schematic diagram of the base station communications, according to the present invention.

Referring to FIG. 3, a schematic representation of a base station arrangement according to the invention is shown. A plurality of micro-cell base stations 14 may be coupled to a micro-cell base station controller 20 which in turn is coupled to a mobile service switching center 22. Similarly, a cell base station 16 is coupled to a cell base station controller 18. Like the micro-cell base station controller 20, the cell base station controller 18 is coupled to the mobile service switching center 22. Depending upon the needs of the locality served by the cellular system, any number of base stations 14, 16 may be coupled to any number of base station controllers 18, 20 and mobile service switching centers 22 without departing from the scope of the invention.

The mobile service switching center 22 performs interfacing functions between base station controllers 18, 20 and other communications networks such as land based telephone networks. The mobile service switching centers 22 also provide data processing and storage functions to manage the processing of calls. To this end, the mobile service switching center 22 includes a visitor location register 24 for storing data representative of the location of a mobile telephone user after a call is established. The mobile service switching center 22 is further coupled to a registration center 26 to provide some of the processing and storage tasks in managing the hybrid cellular radio communication system 1.

In operation, as a mobile telephone user moves from the area covered by a first micro-cell 10 into the area of a second, neighboring micro-cell 10, the call is transferred or "handed off" therebetween. During the hand-off, the frequency of the call communication link (also referred to as "traffic channel") is switched (transparent to the user) to a frequency allocated to the second micro-cell 10, which is typically distinct from the frequencies allocated to the first micro-cell 10. In addition, the visitor location register 24 associated with the call is updated to reflect the new micro-cell location of the user. These changes, along with other data transfers (e.g., signal strength level, power level, etc.), are handled by the corresponding micro-cell base stations 14, micro-cell base station controllers 20, mobile service switching centers 22 and registration center 26 of the hybrid cellular system 1. The hand-off procedure is repeated every time a mobile telephone user crosses a boundary between micro-cells 10.

In the present invention, when a mobile telephone user is traveling at a rapid pace (such as when traveling along a highway or railway during the call) many micro-cell boundaries will be crossed. This is due to the typically small size of a micro-cell (e.g., 1 km radius). As a result, a large amount of protocol and data exchange overhead for the one call occurs.

Figure 4:
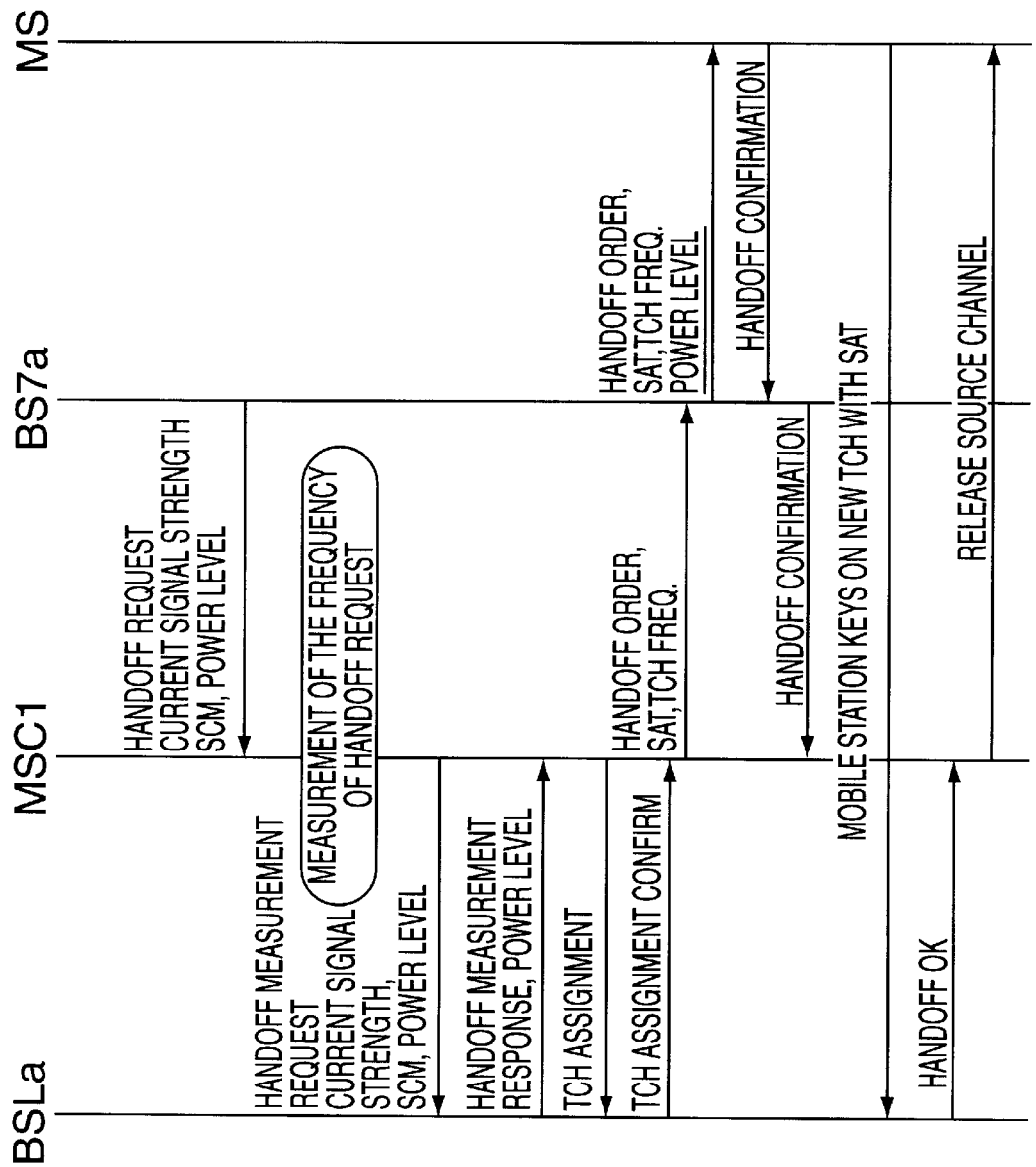
FIG. 4 is a diagrammatic representation of the protocol between components of a hybrid cellular communication arrangement when transferring the call to a larger geographic cell layer, according to the invention.

Advantageously, as disclosed in FIG. 4, the present hybrid cellular system 1 monitors the number of hand-off requests that occurs for an on-going call. If the number of requests exceeds a preset limit within a predetermined time span, the call is switched from a micro-cell 10 to a cell 12 for handling.

In such a situation, the micro-cell base station 14, in this example BS7a, has been sending repeated hand-off requests to the mobile service switching center 22. Every time that a hand-off occurs, the visitor location register 24 of the mobile service switching center 22 is updated with the new location of the caller. The mobile service switching center 22 monitors the number of requests by comparing the number of times that the visitor location register 24 is changed for the particular call, to a preset limit. The first change to the visitor location register 24 is ignored in case the call may have originated when the caller was in close proximity to the boundary of a micro-cell 10. After the first change to the visitor location register 24, the frequency of changes is monitored by the mobile service switching center 22.

The mobile service switching center 22 determines, in this example, that the call should be handed-off to a cell base station 16. Thereafter, a protocol exchange between the cell base station 16 and the mobile service switching center 22 prepares for the call hand-off by exchanging, among other data, current signal strength, the power level of the mobile telephone, and assignment of a new traffic channel frequency (represented as "TCH") over which the call communication occurs. After such a protocol exchange, the mobile service switching center 22 sends a hand-off order, the traffic channel frequency, a supervisory audio tone (represented as "SAT") and the new power level to the micro-cell base station 14 which in turn relays the data to the mobile telephone. The mobile telephone responds with a hand-off confirmation signal, and keys in to the new traffic control frequency of the cell base station 16 at the increased signal power level, upon transmission of the supervisory audio tone. Finally, the cell base station 16 notifies the mobile service switching center 22 of the completed hand-off. The mobile service switching center 22 them prompts the mobile telephone to release the channel frequency that was being used (the "source channel").

Figure 5:
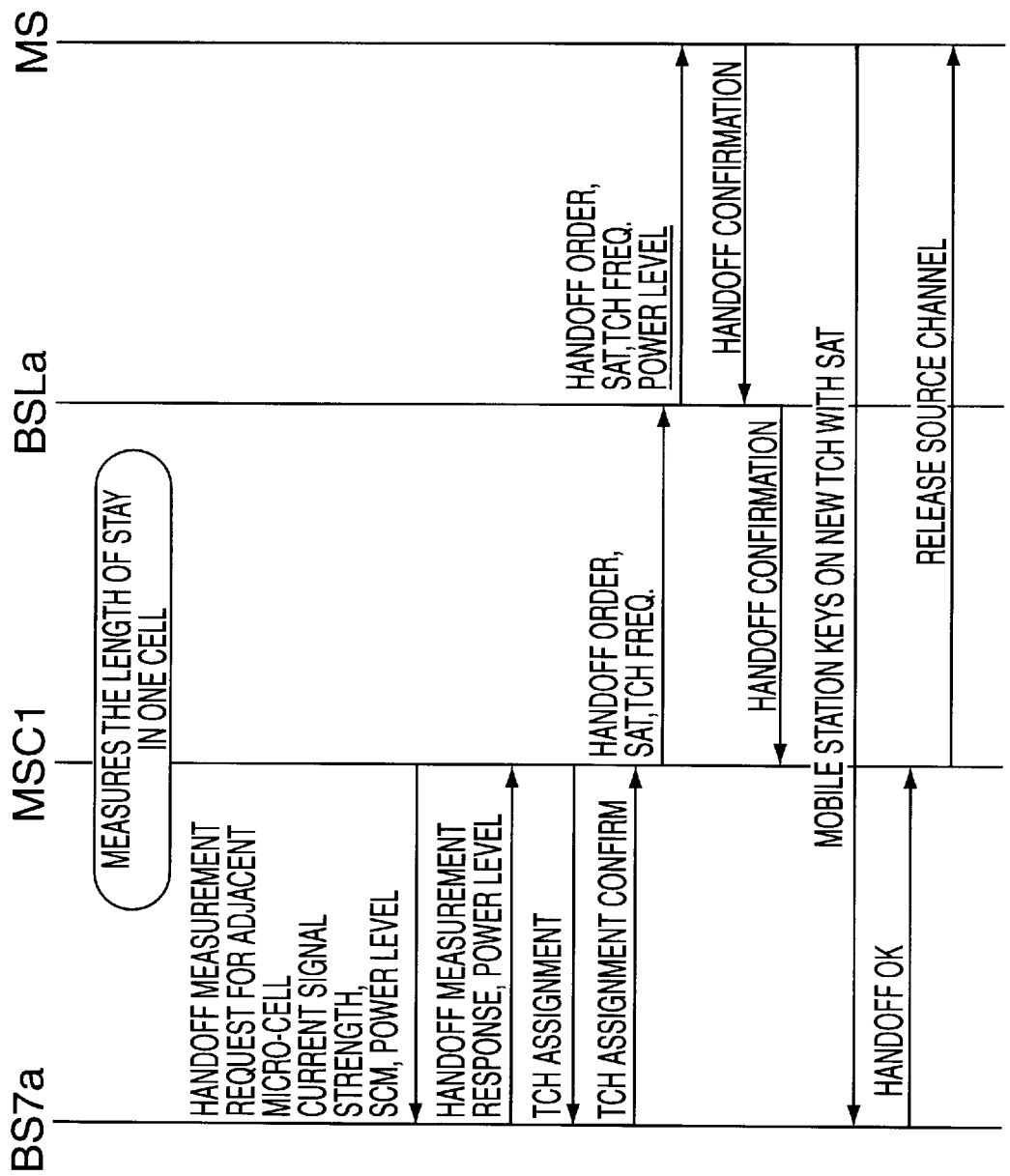
FIG. 5 is a diagrammatic representation of the protocol between components of a hybrid cellular communication arrangement when transferring the call to a smaller geographic cell layer, according to the invention.

FIG. 5 displays a mirror image of the protocol exchange described above for the situation when a call is passed from a cell base station 16 to a micro-cell base station 14. After a call has been handed-off from a micro-cell 10 to a cell 12, the mobile service switching center 22 will monitor the duration of time that the mobile telephone user remains in the same cell 12 by monitoring the visitor location register 24. If the mobile telephone user stays for a time greater than a preset threshold limit, then the call will get handed-off from the cell 12 to the appropriate micro-cell 10. Accordingly, the reverse protocol of that disclosed in FIG. 4 occurs to properly transfer the call.

Here, the mobile service switching center 22 initiates a hand-off request with a micro-cell base station 14, in accordance with the location information stored in the visitor location register 24. A protocol between mobile service switching center 22 and micro-cell base station 14 provides, inter alia, signal power level data and the assignment of a new traffic channel frequency. Thereafter, the mobile service switching center 22 sends a hand-off order, the new traffic channel frequency and a supervisory audio tone to the cell base station 16 handling the call. This data, along with additional the signal power level is communicated to the mobile telephone. A hand-off confirmation from the mobile telephone is returned to the mobile service switching center 22 through the cell base station 16.

The mobile telephone now begins communication with micro-cell base station 14 over the new traffic channel frequency. The micro-cell base station 14 informs the mobile service switching station 22 of the successful call transfer. Finally, the mobile service switching station 22 prompts the mobile telephone to release the previous (source) traffic channel.

Figure 6:
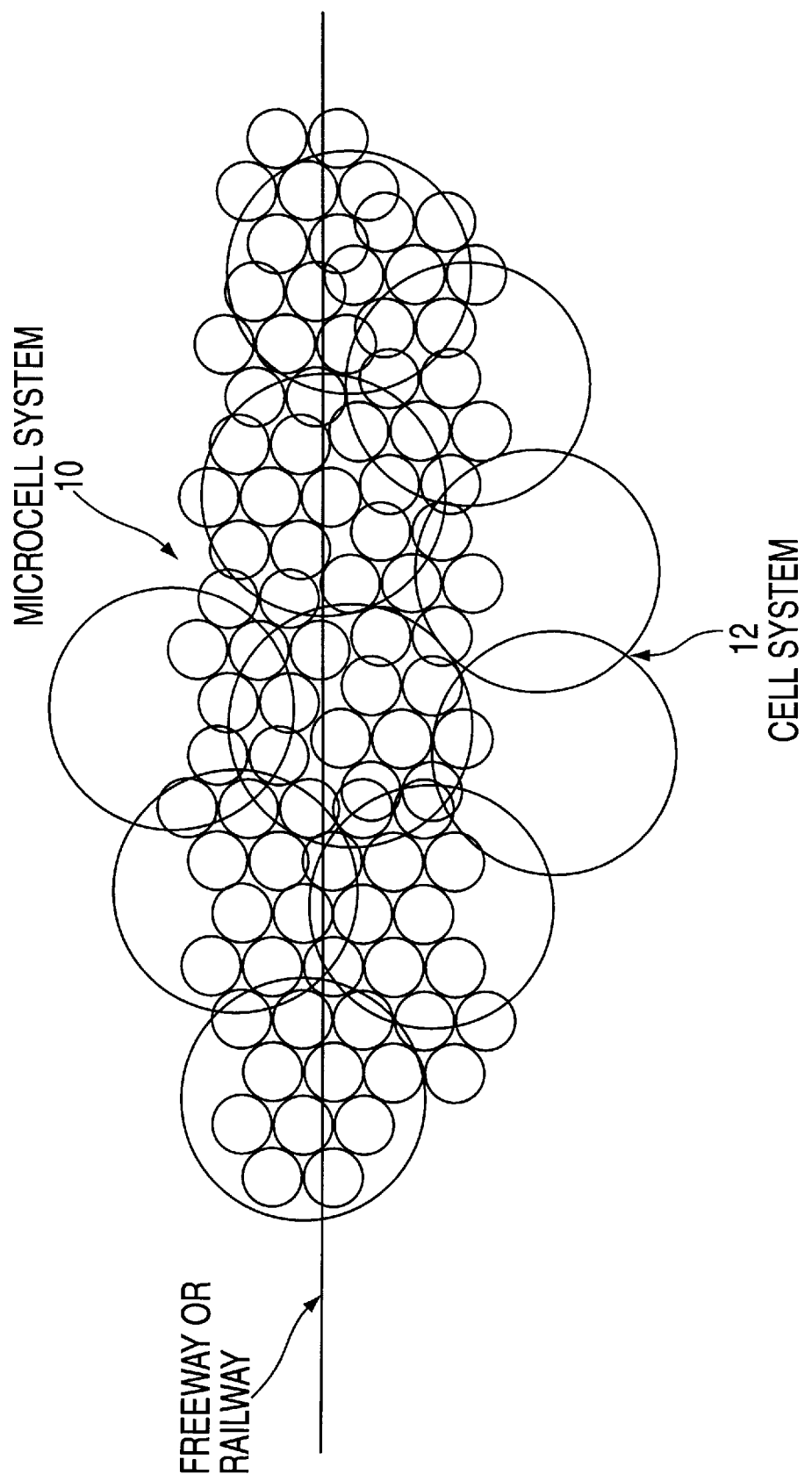

The hybrid cellular radio communication system 1 of the present invention is applicable for cellular networks in urban areas which provide coverage for frequently traveled highways or railways (see FIG. 6). For these types of conditions, cellular system overhead and call interruptions and disconnections can be greatly reduced by use of the present invention.

As can be understood, the hybrid cellular radio communication system 1 contemplated by the present invention may be implemented programmatically or by direct electrical connection through customized integrated circuits, or a combination of both, using any of the methods known in the industry for providing the functions described above without departing from the teachings of the invention. Those skilled in the art will appreciate that from the disclosure of the invention provided herein, commercial semiconductor integrated circuit technology would suggest numerous alternatives for actual implementation of the functions of the hybrid cellular radio communication system 1 that would still be within the scope of the invention.

Although the invention has been described in detail with particular reference to a preferred embodiment thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention.

What is claimed:

1. A method of reducing the number of transfers of an ongoing call of a mobile telephone user between micro-cells of a cellular radio system, said cellular radio system having a first layer of micro-cells, a second layer of cells overlaying said micro-cells, wherein each cell covers the geographic area of a plurality of micro-cells and a centralized switching station having at least one register for storing data, said method comprising the steps of:

storing the micro-cell location of the mobile telephone user in the register;

changing the micro-cell location in the register after the mobile telephone user moves into another micro-cell and the transfer of the call between micro-cells is confirmed;

monitoring the frequency of the changes in the register for a predetermined time duration;

comparing the frequency of the changes in the register to a first predetermined threshold;

transferring the ongoing call from a micro-cell in the first layer to a cell in the second layer when the switching station determines that the frequency of the changes in the register for the predetermined time duration is greater than the first predetermined threshold;

wherein said transferring of the ongoing call between a micro-cell in the first layer and a cell in the second layer comprises altering the frequency of the ongoing call from a frequency associated with the micro-cell in the first layer to a new frequency associated with a cell in the second layer;

monitoring the time duration that a cell in the second layer is handling the ongoing call;

comparing the time that the ongoing call is handled by a cell in the second layer to a second predetermined threshold; and transferring the ongoing call back to a micro-cell in the first layer when the switching station determines that the time that the ongoing call handled by a cell in the second layer is greater than the second predetermined threshold;

wherein said transferring of the ongoing call between a cell in the second layer and a microcell in the first layer comprises altering the frequency of the ongoing call from the frequency associated with the cell in the second layer to a frequency associated with a microcell in the first layer.

2. A method of reducing the number of transfers of an ongoing call of a mobile telephone user between micro-cells of a cellular radio system according to claim 1 further comprising the step of increasing the signal power of the ongoing call after the call is transferred from a micro-cell in the first layer to a cell in the second layer, and decreasing the signal power of the ongoing call after the call is transferred from a cell in the second layer to a micro-cell in the first layer.

3. A method of reducing the radio communications in a cellular radio communications system having a plurality of micro-cells to control the radio communications of a mobile telephone user, a plurality of cells overlaying the micro-cells, wherein each cell functions as a micro-cell and covers the geographic area of several adjacent micro-cells, and at least one switching station having a storage register for recording data indicative of the micro-cell or cell controlling the radio communications of the mobile telephone user, said method comprising the steps of:

recording in the register data indicative of the micro-cell controlling the radio communications of a mobile telephone user after a call connection is established;

updating the micro-cell location in the register only after the mobile telephone user has moved to another microcell and a micro-cell to micro-cell transfer of the radio communication for the mobile telephone user has been confirmed;

monitoring the number of confirmed micro-cell to micro-cell transfers for a preset time period, said time period being activated after the first micro-cell to micro-cell transfer has been completed;

changing the frequency of the radio communications of the mobile telephone user from a frequency used by the micro-cell controlling the radio communications to a new frequency used by a cell covering the area of the micro-cell when the switching station determines that the number of updates to the register exceeds a first preset threshold within the preset time period;

monitoring the time duration that a cell is controlling the radio communications of a call; and changing the frequency of the radio communications of the mobile telephone user from a frequency used by the cell to a frequency used by the micro-cell when the switching station determines that the time that the call is controlled by a cell exceeds a second preset threshold.

4. A method of reducing the radio communications in a cellular radio communications system according to claim 3 further comprising the step of increasing the signal power of the call after the call is changed from a frequency used by the micro-cell to a frequency used by the cell.

5. A method of reducing the radio communications in a cellular radio communications system according to claim 3 further comprising the step of decreasing the signal power of a call after the call is changed from a frequency used by a cell to a frequency used by a micro-cell.

6. A method of reducing the radio communications in a cellular radio communications system according to claim 3 wherein the step of monitoring the frequency of changes in the register is activated after a first micro-cell to micro-cell call transfer has occurred.

\* \* \* \* \*